Patented Jan. 20, 1942

2,270,594

UNITED STATES PATENT OFFICE 2,270,594

SOLDERING ALLOY

Josef Leuser, Pforzheim, Germany, assignor, by mesne assignments, to Chemical Marketing Company Inc., New York, N. Y.

No Drawing. Application October 31, 1938, Serial No. 238,064. In Germany November 5, 1937

2 Claims. (Cl. 75—134)

My invention relates to soldering alloys which are highly resistant against tarnishing.

The precious metal working industry is very much interested in solders which possess a sufficient resistance against tarnishing beside the usual necessary qualities.

Thorough experiments have shown that all the desired qualities of solderings, as for instance low melting point, easy fusibility, resistance against tarnishing, utilisation together with the used fluxes, excellent capacity of rolling, are to be found in such alloys which contain silver, palladium, gold, copper and cadmium in definite quantities, i. e.

| | Per cent |
|---|---|
| Palladium | 15–35 |
| Gold | 10–25 |
| Copper | 7–20 |
| Cadmium | 5–15 |
| Silver | Rest |

Preferably alloys are used which contain

| | Per cent |
|---|---|
| Palladium | 18–30 |
| Gold | 12–20 |
| Copper | 12–15 |
| Cadmium | 9–12 |
| Silver | Rest |

The addition of small quantities of other metals, either alone or in combination may influence the qualities of the solder to a certain extent. The quantity of these additional metals shall in general not exceed about 5 percent, preferably 4 percent. The addition of small quantities, for instance, about 0.1 to 2.5 percent Zn produces more dense castings and the addition of small quantities of manganese, for instance, about 0.03 to 0.6 percent improves the rolling capacity of the soldering alloy and the addition of both metals in the proportions mentioned above improves the alloys in both directions.

The following are a number of examples of excellent suitable alloys for soldering purposes according to my invention:

| | Pd | Au | Ag | Cu | Cd | Zn | Mn |
|---|---|---|---|---|---|---|---|
| 1 | 18 | 10 | 50 | 11.5 | 9.0 | 1.5 | |
| 2 | 18 | 10 | 50 | 12.2 | 9.0 | 0.5 | 0.3 |
| 3 | 18 | 15 | 45 | 8.5 | 12 | 1.5 | |
| 4 | 20 | 10 | 45 | 13.35 | 10 | 1.5 | 0.15 |
| 5 | 30 | 20 | 27 | 18 | 5 | | |
| 6 | 30 | 20 | 27 | 17.85 | 5 | 0.15 | |
| 7 | 30 | 20 | 27 | 17.7 | 5 | 0.15 | 0.15 |
| 8 | 30 | 20 | 22 | 14.7 | 10 | 0.15 | 0.15 |

These small additional quantities such as zinc or manganese or both may be replaced by or added to titanium, silicon which have a similar effect to manganese, or magnesium, calcium boride and the like. Manganese, magnesium, titanium, silicon and calcium boride are deoxidising agents.

The solderings according to my invention may be employed for many purposes. They may, for instance, be used for the soldering of palladium-silver-gold alloys, of stainless steels, of chromium-nickel alloys and so on.

Apart from the above mentioned excellent qualities of the solderings according to my invention, such as resistance against tarnishing and the like, my invention has also the advantage to enable the manufacture of solderings with relatively low melting points, for instance, of about 850° C. and below, which may be found in the solderings No. 1, 2, 3 and 4 in the above mentioned table. At the same time my invention allows the production of solderings with higher melting points for instance such as are required for the soldering of higher melting alloys, as for instance stainless steels, chromium-nickel alloys and the like. These solders with a melting point of about 950° C. and below are marked in the table with No. 5, 6, 7 and 8.

The above mentioned soldering alloys have in general a white colour. If desired, there may be also manufactured solders of a more or less yellowish colour, which may be applied for yellow gold alloys especially such with high contents of gold. For these purposes the following compositions have proved to be excellent:

| | Per cent |
|---|---|
| Gold | 25–85 |
| Palladium | 2–20 |
| Copper | 5–30 |
| Cadmium | 3–25 |
| Silver | 0–20 |
| Zinc | 0–5 | or

| | Per cent |
|---|---|
| Gold | 50–70 |
| Palladium | 5–10 |
| Copper | 10–25 |
| Cadmium | 3–25 |
| Silver | 0–10 |
| Zinc | 0.5–2 |

The following are a number of examples of the above mentioned compositions:

| | Pd | Au | Ag | Cu | Cd | Zn |
|---|---|---|---|---|---|---|
| Solder I | 100 | 550 | 110 | 150 | 80 | 10 |
| Solder II | 80 | 550 | 100 | 120 | 140 | 10 |

What I claim is:

1. A soldering alloy highly resistant against tarnishing consisting of 15% to 35% of palladium, 10% to 25% of gold, 7% to 20% of copper, 5% to 15% of cadmium and the remainder substantially all silver.

2. A soldering alloy highly resistant against tarnishing, consisting of 18% to 30% of palladium, 12% to 20% of gold, 12% to 15% of copper, 9% to 12% of cadmium, and the remainder substantially all silver.

JOSEF LEUSER.